May 31, 1949. J. I. HAMILTON 2,471,953
PITCH CONTROLLING SYSTEM FOR PROPELLER BLADES
Filed July 7, 1944
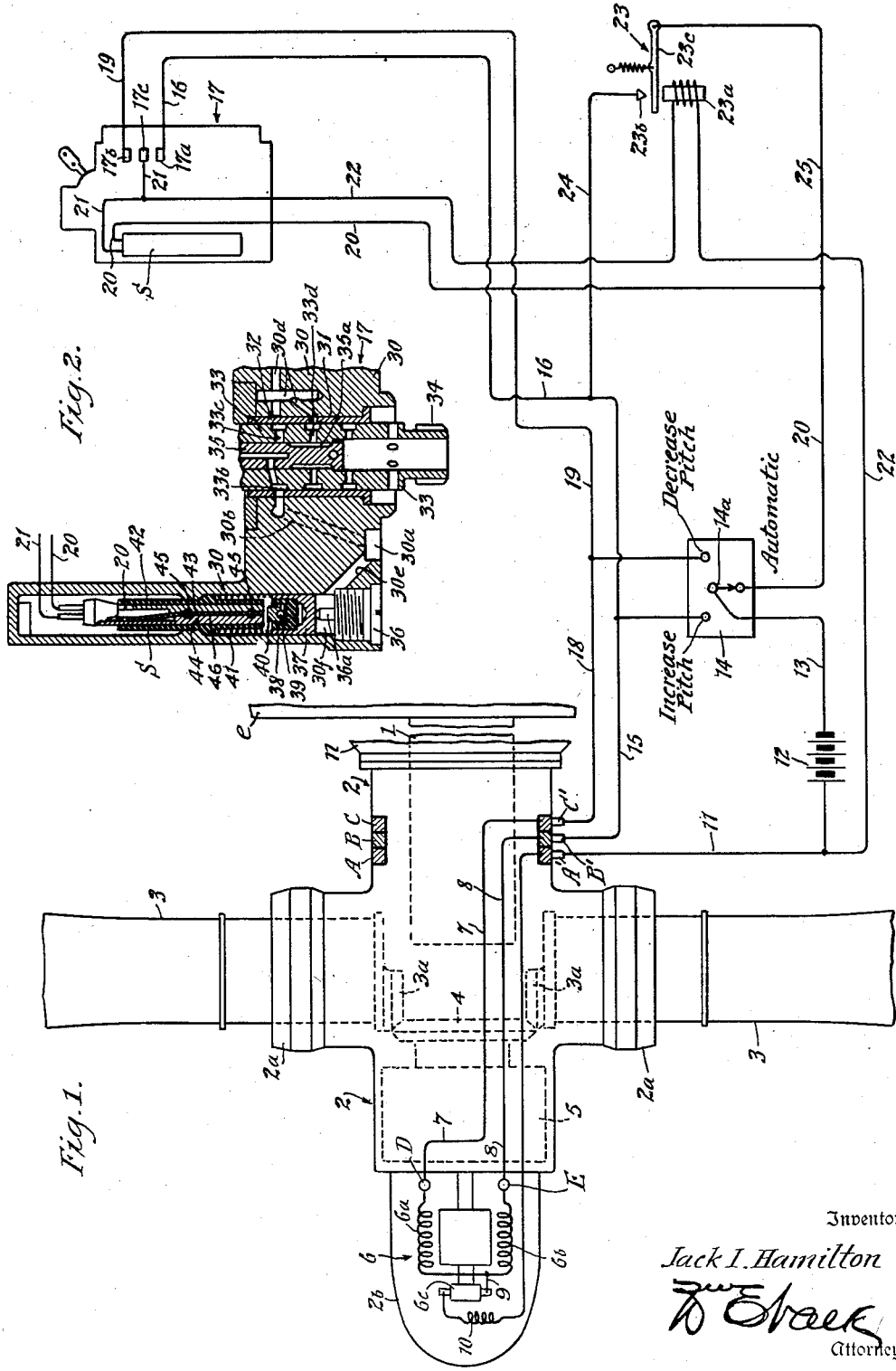
Inventor
Jack I. Hamilton
Attorney Patented May 31, 1949

2,471,953

UNITED STATES PATENT OFFICE 2,471,953

PITCH CONTROLLING SYSTEM FOR PROPELLER BLADES

Jack I. Hamilton, Essex Fells, N. J., assignor to Curtiss-Wright Corporation, a corporation of Delaware Application July 7, 1944, Serial No. 543,861

6 Claims. (Cl. 170—135.72)

My invention relates to a system for controlling the pitch of propeller blades.

My invention has reference to a system including a governor, or equivalent, for controlling the pitch of propeller blades to thereby maintain the propeller driving engine at constant speed, said system comprising means for changing the pitch of the propeller blades in response to abnormal operation of said engine or of said governor, or equivalent.

More particularly, the aforesaid propeller blades are driven by an aircraft engine and the governor is dependent upon engine oil pressure for normal operation, the arrangement being such that, in the event of failure of oil pressure, the pitch of the propeller blades is automatically increased.

Various other objects, advantages and features of my invention will become apparent from the following detailed description.

My invention resides in the pitch-controlling system for propeller blades and control arrangement of the character hereinafter described and claimed.

For an understanding of my invention and for an illustration of one of the forms thereof, reference is to be had to the accompanying drawings, in which:

Figure 1 is a diagrammatic view showing a pitch-controlling system of the invention; and Fig. 2 is a fragmentary sectional view showing an important feature of the invention.

Referring to Fig. 1, the nose $n$ of an aircraft engine $e$ is shown as having extending therefrom a propeller shaft 1 having secured thereto a hub 2 comprising sockets 2a, 2a in which the respective propeller blades 3, 3 are journalled. For pitch-changing, each propeller blade 3 has an integral gear 3a at its shank which meshes with a ring gear 4 driven through a double planetary speed-reducing system, indicated at 5, by a reversible electric motor, schematically shown at 6, which is enclosed within a housing 2b suitably attached to the hub 2. Power is supplied to the motor 6 through slip rings A, B and C with which brushes A', B' and C' are coactable, respectively.

As shown, the motor 6 comprises oppositely wound field coils 6a and 6b, the field coil 6a being connected by a conductor 7 which includes a limit switch D to slip ring C, the field coil 6b being connected by a conductor 8 which includes a limit switch E to slip ring B.

The limit switches D and E are normally closed single-pole, single-throw switches which are opened automatically when the blades attain limiting low and high pitch positions to thereby prevent operation of their respective pitch-changing circuits until the propeller blades are once again within their normal pitch range as defined by the respective limiting positions thereof.

The field coils 6a and 6b have a common terminal from which extends a conductor 9, including the motor commutator 6c together with a brake coil 10 and terminating at slip ring A.

It will be recognized that I have described a well known electric pitch-changing propeller system. The description, however, is representative of many types of propeller systems and I do not wish to confine myself to any particular type thereof.

Connected to the brush A' is a conductor 11 which extends to one terminal of a battery 12, the other terminal of which is connected by a conductor 13 to the arm 14a of a selector switch 14. A conductor 15 joins brush B' with the "increase pitch" terminal of switch 14 and has branching therefrom a conductor 16 which leads to a contact 17a of an automatic governor 17, as known in the art and which, for example, may be of the type disclosed in Patent No. 2,449,452, filed March 15, 1939. Extending from brush C' is a conductor 18 which is connected to the "decrease pitch" contact of switch 14. Branching from conductor 18 is a conductor 19 which is secured to a contact 17b of the governor 17. The "automatic" contact of switch 14 is connected to one terminal of an oil pressure switch S by a conductor 20, the other terminal of switch S being connected to the central movable contact 17c of the governor 17 by a conductor 21.

As will become apparent from the following description, the pressure switch S is normally closed, but opens upon a sufficient decrease in pressure of the oil supplied to the governor 17, for example, as may occur during diving of the aircraft.

Branching from conductor 11 is a conductor 22 which includes a solenoid coil 23a of a relay 23 and extends to contact 17c of governor 17. Branching from conductor 16 is a conductor 24 which is connected to a relay contact 23b with which coacts a relay armature 23c connected to the aforesaid conductor 20 by a conductor 25.

Referring particularly to Fig. 2 and as more fully described in the aforesaid pending application, Serial No. 261,879, filed March 15, 1939, the governor 17 is shown as comprising a housing 30 having a bore 31 which receives a bushing 32 having a sleeve 33 rotatable therein, said sleeve 33 terminating at one end in a pinion 34 which meshes with a suitable gear, not shown, operated by the aircraft engine. At its other end, the sleeve 33 terminates in a plate, not shown, serving as a support for the governor flyweights. Mounted for reciprocatory movement in the sleeve 33 is a valve stem 35 carrying, at its upper end, suitable mechanism, not shown, for operating the aforesaid flyweights. Near its lower end, the valve stem 35 comprises an annular groove 35a utilizable as hereinafter described.

The housing 30 comprises a segmental groove 30a which communicates with a conduit, not shown, traversed by oil under pressure from the oiling system of the aircraft engine e. The groove 30a communicates with a passage 30b which, in turn, communicates with an annulus 33b formed in the aforesaid sleeve 33, the latter, in addition, having a passage 33c through which oil passes to the annular groove 35a of the valve stem 35. From the annular groove 35a, oil flows to a lower radial passage 33d in the sleeve 33 which communicates with passages 30d leading to a cylinder, not shown, in which is mounted the piston which operates the hereinbefore described governor contact 17c.

A passage 30e of the housing 30 communicates with the aforesaid housing groove 30a, said passage 30e communicating with a bore 30f of the governor housing 30. Threaded into and closing the bottom of the bore 30f is a plug 36 having a point 36a adapted to be engaged by a piston 37 carrying an insulating bushing 38 within which rests a ball 39 carrying a contact button 40 movable with the piston 37. Normally, the piston 37 is biased downwardly by a spring 41 enclosing an insulating sleeve 42 which, in turn, embraces contact bars 43 and 44 axially located in the bushing 38 by insulating pins 45, the contact bars 43 and 44 being insulated from each other by a strip 46. The conductors 20 and 21, hereinbefore described, are connected to the respective contact bars 43, 44.

As fully described in the aforesaid pending application Serial No. 261,879, filed March 15, 1939, oil under pressure from the aircraft engine is effective in the groove 30a and in the passages 30b, 30e. Under the control of the valve stem 35, oil passes from the passage 30b, to the annulus 33b and from thence to the passage 33c, the annular groove 35a and the passage 30d. As stated, oil from the passage 30d passes to a cylinder for controlling a piston carrying the aforesaid governor contact 17c.

During normal operation of the governor 17, the effective oil pressure in the passage 30e and beneath piston 37 is sufficient to maintain contact between the button 40 and the bars 43, 44. If the oil pressure should fail or the pressure thereof should decrease to a substantial extent, the piston 37 is moved downwardly by the spring 41 to thereby break the contact between button 40 and the contact bars 43, 44 with resultant opening of the circuit through conductors 20, 21.

Whenever a positive voltage is impressed upon one of the field coils 6a or 6b, current passes through the motor commutator 6c, brake coil 10, slip ring A, brush A' and conductor 11 to the negative terminal of the battery 12. The brake coil 10, when energized, releases a mechanical locking arrangement, not shown, thus permitting operation of the motor 6 to thereby increase or decrease the pitch of the propeller blade depending on whether field coil 6b or field coil 6a is energized.

With the selector switch 14 in "increase pitch" position, current passes from the positive terminal of battery 12 through conductor 13, arm 14a, conductor 15, brush B1, slip ring B and conductor 8 which includes limit switch E to the field coil 6b to thereby cause the propeller blades 3 to increase pitch. With the selector switch 14 in "decrease pitch" position, current passes from the positive terminal of the battery 12 through conductor 13, arm 14a, conductor 18, brush C', slip ring C and conductor 7 which includes limit switch D to the field coil 6a to thereby cause the propeller blades 3 to decrease pitch. Thus, I provide for manual control of the pitch-changing apparatus at all times.

With the selector switch 14 in "automatic" position, current passes from the positive terminal of the battery over a circuit which includes conductor 13, arm 14a, conductor 20, the oil pressure switch S and conductor 21. From the latter, current passes through conductor 22 which includes the solenoid coil 23a, to the negative terminal of the battery 12 to thereby cause energization of the relay 23 with resultant attraction of the armature 23c from the contact 23b.

When contact 17c engages contact 17a, current passes through conductor 16, conductor 15, brush B', slip ring B and conductor 8, which includes limit switch E, to field coil 6b to thereby cause the propeller blades to increase pitch. When contact 17c engages contact 17b, current passes through conductor 19, conductor 18, brush C', slip ring C and conductor 7, which includes limit switch D, to field coil 6a to thereby cause the propeller blades to decrease pitch. The vertical position of contact 17c is dependent upon the speed of the aircraft engine and the governor 17 accordingly operates, in well understood fashion, to maintain a substantially constant speed of rotation of the aircraft engine.

In the event that the oil pressure supply to the governor 17 fails, the safety switch S opens and the supply of current to contact 17c is cut off. Accordingly, the automatic governor 17 no longer operates to cause pitch change of the propeller blades and the solenoid 23a of relay 23 is deenergized with resultant closure of the armature 23c on the contact 23b.

The propeller blades at once start to increase pitch as current from the battery 12 passes to field coil 6b through conductor 13, arm 14a, conductor 20, conductor 25, armature 23c, contact 23b, conductor 24, conductor 16, conductor 15, brush B', slip ring B, conductor 8 and limit stop E.

This pitch increase continues either until the blades reach their limiting high pitch position to cause opening of limit switch E or until the governor oil pressure is restored to cause closure of the pressure switch S in which case relay 23 is energized to terminate the described increased pitch operation of the propeller blades and current is again supplied to contact 17c to thereby cause the governor 17 to resume control of the pitch-changing motor 6.

In view of the foregoing, it will be understood that, in the event there is substantial or undesired drop in the engine oil pressure, the arrangement of my invention functions immediately to automatically increase the pitch of the propeller blades. When such a decreased oil pressure exists, it is highly desirable for the propeller blades to be in high pitch to prevent over-speeding of the aircraft engine. More particularly with respect to the foregoing, should an airplane equipped with the pitch-changing system of this invention be placed in a power drive, the oil pressure at the governor is decreased. If such decrease is substantial, the safety switch S opens with resultant disconnection of the automatic governor 17 from the pitch-changing circuit and the establishment of another circuit at the relay 23 which energizes the increase-pitch winding of the pitch-changing motor to thereby cause the propeller blades to move to extreme high pitch position. This, as stated above, is highly desirable because preventing overspeeding of the airplane motor.

While the invention has been described with respect to a certain particular preferred example which gives satisfactory results, it will be understood by those skilled in the art after understanding the invention, that various changes and modifications may be made without departing from the spirit and scope of the invention, and it is intended therefore in the appended claims to cover all such changes and modifications.

What is claimed as new and desired to be secured by Letters Patent is:

1. In a variable pitch propeller system, an engine having an oiling system, a propeller hub driven by said engine, propeller blades journaled in said hub, means for changing the pitch of said propeller blades, a governor and an electrical circuit for controlling said pitch-changing means to maintain said engine at substantially constant speed, an auxiliary electrical circuit for operating said pitch changing means to increase propeller pitch, a switch in said governor circuit having a contact member movable in response to substantial decrease in pressure in said engine oiling system to open said electrical circuit and render said governor non-operative, and means responsive to movement of said contact member for closing said auxiliary electrical circuit to actuate said pitch-changing means for increasing the pitch of said propeller blades.

2. In a variable pitch propeller system, an engine having an oiling system, a propeller hub driven thereby, propeller blades journalled in said hub, an electrical motor having windings energizable alternately for increasing and decreasing the pitch of said propeller blades, a governor and a primary electrical circuit in which said windings are included, an auxiliary electrical circuit for energizing the increase pitch winding of said motor, a switch in said primary circuit having a contact member movable in response to substantial decrease in pressure in said engine oiling system to open said primary electrical circuit and render said governor non-operative, and means responsive to movement of said contact member for closing said auxiliary electrical circuit to energize the increase-pitch winding of said motor.

3. In a variable pitch propeller comprising a pitch changing motive means controlled by a governor, an engine for driving said propeller and governor, and means independent of pilot control responsive to abnormal engine operation for disconnecting said governor from control over said pitch changing motive means; a normally inactive control to operate said motive means to increase propeller pitch, and means responsive to the disconnection of said governor from said pitch changing motive means to activate said normally inactive control.

4. In a variable pitch propeller comprising a pitch changing motive means controlled by a governor, an engine for driving said propeller and governor, and means independent of pilot control responsive to abnormal engine operation for disconnecting said governor from control over said pitch changing motive means; a normally open switch closable to energize said motive means for increasing propeller pitch, and means to close said switch responsive to the disconnection of said governor from said motive means.

5. In a variable pitch propeller system comprising a pitch changing motive means controlled by a governor, an engine for driving said propeller and governor, and a fluid pressure system upon which said governor is at least in part dependent, said fluid pressure system in turn being dependent on normal operation of said engine; a switch closable in response to existence of certain fluid pressure and openable in response to abnormal deviations of fluid pressure, a relay responsive in its closure to opening of said switch, and means actuated by closure of said relay to increase the pitch of said propeller.

6. In a variable pitch propeller system comprising a pitch changing motive means controlled by a governor, an engine for driving said propeller and governor, and a fluid pressure system upon which said governor is at least in part dependent, said fluid pressure system in turn being dependent on normal operation of said engine; a switch closable in response to existence of certain fluid pressure and openable in response to abnormal deviations of fluid pressure, a relay responsive in its closure to opening of said switch, and means actuated by closure of said relay to increase the pitch of said propeller, the control of said motive means by said governor being dependent on the closure of said switch.

JACK I. HAMILTON.

REFERENCES CITED

The following references are of record in the file of this patent:

UNITED STATES PATENTS

| Number | Name | Date |
|---|---|---|
| 1,987,651 | Wiegand | Jan. 15, 1935 |
| 2,228,776 | Mullen | Jan. 14, 1941 |
| 2,257,126 | Rindfleisch | Sept. 30, 1941 |

FOREIGN PATENTS

| Number | Country | Date |
|---|---|---|
| 517,372 | Great Britain | Jan. 29, 1940 |
| 538,386 | Great Britain | July 31, 1941 |